US005437749A

United States Patent [19]

Pipkorn et al.

[11] Patent Number: 5,437,749

[45] Date of Patent: Aug. 1, 1995

[54] SPLICE SYNCHRONIZATION SYSTEM

[75] Inventors: Alan J. Pipkorn; David G. Flessert; Rose M. Cibulka, Phillips, Wis.

[73] Assignee: Marquip, Inc., Phillips, Wis.

[21] Appl. No.: 131,150

[22] Filed: Oct. 4, 1993

[51] Int. Cl.[6] .............................................. B32B 31/00

[52] U.S. Cl. ...................................... 156/64; 156/157; 156/351; 156/353; 156/361; 156/502; 156/504; 242/554.1; 242/554.2

[58] Field of Search ................. 156/64, 157, 351, 361, 156/362, 363, 502, 504, 353; 242/554.1, 554.2, 555

[56] References Cited

U.S. PATENT DOCUMENTS

| | | | |
|---|---|---|---|
| 3,966,518 | 6/1976 | Ferara | 156/64 |
| 3,967,994 | 7/1976 | Langberg | 156/64 |
| 3,970,489 | 7/1976 | Schmidt et al. | 156/64 |
| 3,981,758 | 9/1976 | Thayer et al. | 156/64 |
| 4,268,341 | 5/1981 | Huhne | 156/353 |
| 4,284,445 | 8/1981 | Shimizu | 156/64 |
| 4,284,445 | 8/1981 | Shimizu | 156/64 |
| 4,564,149 | 1/1986 | Barzanó | 242/554.1 |
| 4,576,663 | 3/1986 | Bory | 156/64 |
| 4,643,783 | 2/1987 | Hogenson | 156/64 |
| 4,795,513 | 1/1989 | Jensen, Jr. | 156/361 X |

*Primary Examiner*—David A. Simmons

*Assistant Examiner*—Paul M. Rivard

*Attorney, Agent, or Firm*—Andrus, Sceales, Starke & Sawall

[57] ABSTRACT

A system for coordinating the splices in each of the component webs used in making a composite corrugated paperboard web independently measures on a dynamic real time basis the length of each component web between the splicer where it is supplied and a downstream cutoff apparatus where the synchronized splices are cut out in a short length of web in which they are contained. The real time measurement of each component web includes continuous monitoring of web lengths subject to change while running through variable length storage areas, and an initialization procedure whereby an initially unknown length of component web in its respective storage is determined. The system also includes a calibration procedure by which the various devices used to measure running web lengths throughout the system are all calibrated to a master device which controls the total web length for each order. Accuracy of the system is further enhanced by independently monitoring the response time of each splicer to its activating control signal and adjusting, as necessary, the timing of the control signal for measured variations in response time.

16 Claims, 1 Drawing Sheet

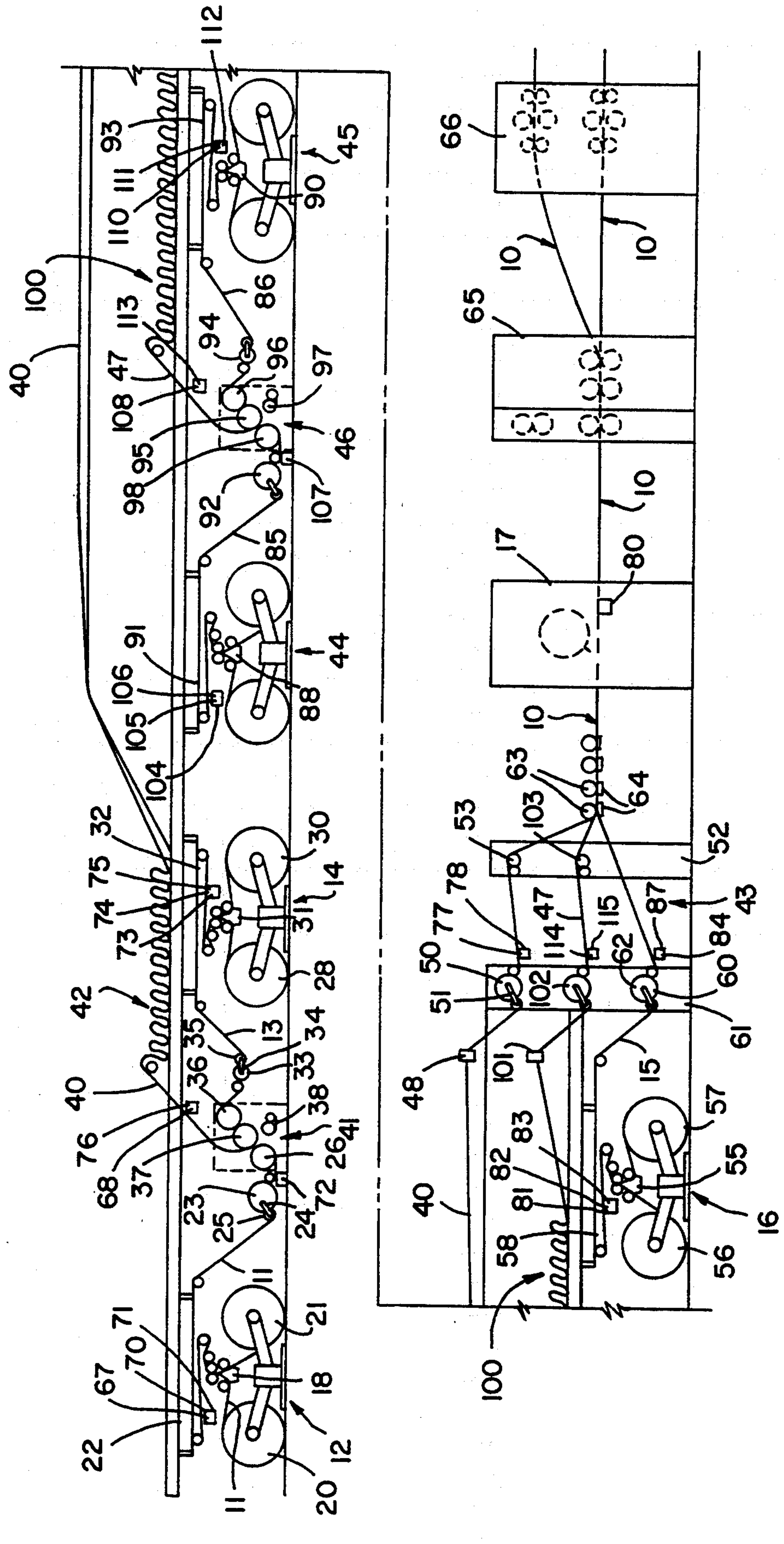

SPLICE SYNCHRONIZATION SYSTEM

BACKGROUND OF THE INVENTION

The present invention pertains to a system for sychronizing the location of splices in the component webs of a composite web and, more particularly, to a method and apparatus for synchronizing the splices in the component webs used to make a composite corrugated paperboard web so that the splices defining an order change are substantially coincident in the paperboard web and may be simultaneously cut out and diverted as scrap.

In a system for making corrugated paperboard in which multiple paper webs are sequentially glued together, unusable scrap may occur for a number of reasons. Defects in the form of tears or other discontinuities in the component paper webs is one source. A lack of adhesive or inadequate adhesive between joining component webs may also result in defects in the composite paperboard web. Scrap is also unavoidably generated where two webs are joined with a splice, either to renew the supply of one of the component webs or to change a characteristic of one of the component webs as at order change.

Because a typical composite paperboard web includes at least two component webs, in the case of "single face" material, and because more typically a composite paperboard web includes at least three component webs, as in so-called "double face" paperboard, web splices are required quite often and each splice must be detected in the completed paperboard web, cut out in a short longitudinal section defined by a pair of spaced transverse cuts, and diverted as scrap. Attempts have long been made in the prior art to accomplish the ideal goal of synchronizing all of the splices in the component webs so that the splices coincide at the same point in the finished composite paperboard web so they may be simultaneously cut out in a single piece of scrap. However, the variable processing ,conditions to which each component web is typically subject in a corrugator wet end where the composite web is formed make web measurement and, therefore splice synchronization, very difficult. For example, in the manufacture of a typical double face paperboard web, a liner web and a corrugated medium web are supplied from separate sources, each of which includes a splicer and a variable length storage or takeup section. The liner and medium webs are brought together in a single facer apparatus and secured by adhesive applied to the corrugated medium upstream of the single facer. The single face web is initially directed to another variable length storage section commonly referred to as a "bridge" from which it is fed at varying rates to be joined with a second liner web in a double facer apparatus to complete the double face corrugated web. Adhesive is applied to the exposed corrugated medium of the single face material after it is drawn out of the bridge before entry into the double facer. The second liner web also travels through a variable length storage section prior to being brought into contact with the adhesive-coated flutes of the single face material in the double facer.

An expanded system used for the production of so-called "double wall" paperboard utilizes an additional single facer and the associated sources of liner and medium webs, each also having its own splicer and variable storage sections, as well as a separate bridge for the second single face web. The single facer and double facer are independently driven and controlled, with the double facer operation dictated by downstream processing requirements such as slitting, cutting, and stacking which comprise certain of the operations in the dry end of the corrugator; whereas, control of operation of the single facer is dictated by maintenance of an adequate bridge storage to accommodate increases in speed of the double facer and to allow the speed of delivery of the liner and medium webs to be decreased to accommodate the requirements of splicer operation. It will be appreciated, therefore, that all of the foregoing variables have made it extremely difficult to synchronize the splices in the component webs of a double face paperboard web. The problems are, of course, increased where an additional single facer is added to the system to manufacture double wall paperboard.

The prior art discloses a number of corrugator control systems which are intended to reduce scrap by synchronizing the splices in the component webs to be simultaneously cut out at order change. Although these systems address certain of the problems associated with accurate splice synchronization, none of them adequately addresses web length monitoring and control, as well as monitoring and control of related processing equipment, in a manner which assures accurate splice synchronization in the composite paperboard web as it moves from the corrugator wet end into the dry end.

U.S. Pat. No. 4,284,445 describes a method and apparatus for coordinating the splices in all web components of a corrugator system to synchronize the splices so that they may be cut out nearly simultaneously to minimize scrap at order change. This system utilizes pulse generators in contact with the component webs at points just upstream of the single facer and the double facer to continuously track component web lengths. The length of single face material deposited in the bridge is tracked by a photo detector system which senses the height and positioning of the loops or folds in the single face material as it accumulates on and moves along a belt conveyor in the bridge. The remaining order length is monitored at the downstream web cut off apparatus and is continuously compared with the component wet lengths being processed in the web end, so that at order change the upstream ends of each component web (presumably spliced to a new component web for the next order) all arrive at the cut off apparatus simultaneously. However, this system does not take into consideration or in any way accommodate the variable component web storage between each splicer and the respective single facer or double facer apparatus. In addition, the method used to detect and measure the length of single face material in the bridge, though possibly accurate enough to utilize as a control parameter for single facer speed, is not believed to be accurate enough a measurement technique for splice synchronization.

U.S. Pat. No. 4,576,663 also discloses a method and apparatus for corrugator wet end control which is intended to synchronize the splices in the component web materials so that the splices substantially coincide to minimize scrap and production down time. As in the above identified prior art patent, the system in this patent also utilizes pulse generators to continuously track the length of certain of the component webs brought together to form the composite paperboard web. Specifically, web lengths are monitored at the medium splicer (or medium splicers in a multi-wall paperboard system), at the double facer liner splicer and at the downstream cut off apparatus. Single face web accumulation in the bridge is monitored with a photoelectric device which senses an optimum storage value and the single facer speed is controlled to maintain that optimum value by adjusting the value in accordance with lengths measured by the pulse generators at the medium splicer and the double facer splicer. An initial web length determination is made for the upstream-most medium web component between its splicer and the downstream cut off apparatus. Once that length determination is made, the lengths of all other web components, including the liner web component to be joined with that medium web component, the liner web added in the double facer, and the component webs for any additional single face component of the composite web, are all based on the initial length determination for the upstream-most medium web component. The calculations utilize premeasured fixed distance components and running web lengths measured by the various pulse generators as modified by bridge storage adjustments mentioned above. The timing of operation of the various web splicers in the system are all based on the initial operation of the upstream-most medium web splicer. In addition, none of the dynamic web length measurements take into account the continuously varying storage length in the takeup or dancer roll associated with each component web splicer. In addition, compensation for variable wrap arm adjustments in the single facers are not accounted for. As a result, there are inherent significant errors in the initial and dependent web length measurements and, because the timed sequence of operation of the various splicers in a downstream direction is based on sequential use of the various measured lengths, there is an error accumulation in the sequential downstream operation of the remaining splicers.

In addition to the variations mentioned above which are not addressed in prior art systems, it is also known that the response time of each of the several splicers in a corrugator wet end system may vary from the response time of the others. Thus, the time between generation of a splice operation signal and the actual execution of the splice by the splicer will vary from one machine to another, even if the splicers are of identical types, depending on such things as relative wear and the like. In addition, the response time of a splicer will normally change over time. Failure to account for such variations also leads to inaccuracies in attempts to synchronize splice location in the completed paperboard web. Each of the splices may be about 5 inches (13 cm) in length and it is desirable to synchronize the splices so that they are all within about three feet (1 meter) of one another to minimize the length of the piece of scrap cut out and diverted from the system.

Therefore, there is a real need for an accurate splice synchronization system for a corrugator wet end operation which will provide accurate and repeatable synchronization of component web splices at order change. Any such system must, of necessity, include means for accurately determining the dynamic real time lengths of each of the multiple component webs, the lengths of each of which are subject to continuous length variation during corrugator operation. Ideally, a web synchronization system should also include means for initially and periodically calibrating the system to account for inevitable errors in measurement attributable to changes in typical web length measuring devices.

SUMMARY OF THE INVENTION

In accordance with the present invention, a method and apparatus are provided which enable accurate dynamic real time measurement of the lengths of each of the component webs in a system for the manufacture of corrugated paperboard. The system addresses and corrects the inaccuracies and deficiencies in prior art systems such that true splice synchronization can be attained in a reasonably short lineal length of the completed paperboard web to minimize diverted scrap.

In its broadest sense, the method of the present invention is effective for synchronizing the location of splices in the component webs of a composite web forming system in which the composite web is formed by joining the component webs from multiple web sources, each of which web sources includes a splicer and a variable length web storage between the splicer and a downstream point of web joining. The system is especially adaptable to the manufacture of composite webs in which at least one of the component webs is subject to a compression in length (e.g. corrugating) by a known compression factor prior to joining. The system also utilizes a downstream cut off apparatus (e.g. shear or cut-off knife) to cut out a selected length of the completed composite web within which selected length all of the component web splices are located.

The method includes the steps of independently measuring on an on-going real time basis the length of each component web between its respective splicer and the downstream cut off apparatus; continuously measuring the length of the composite web passing through the cut off apparatus; continuously subtracting the measured length of the composite web from a total order length to provide a continuously decreasing remaining order length; activating the splicers for each of the component webs when the remaining order length equals the measured real time length of the respective component webs, including applying the compression factor to the component web subject to compression to delay activating its splicer; and, activating the cut off apparatus to provide the selected cut out length of composite web which includes all component web splices.

The preferred method of the present invention is applied to splice synchronization in the component webs of an advancing double face paperboard web which is formed in the wet end of a corrugator from three component web sources each of which includes a splicer, and in which a first liner component web is directed from its source through a first variable length liner web storage or a single facer, a medium component web is directed from its source through a variable length medium web storage and a web corrugator, where the medium web length is compressed by a known compression factor, to the single facer where the first liner and corrugated medium webs are combined to form a single face web, the single face web is directed from its source through a variable length single face storage to a double facer, a second liner component web is directed from its source through a second variable length liner web storage to the double facer where the single face and second liner webs are combined to form the double face paperboard web, and the double face web is directed through downstream dry end processing apparatus. The preferred method includes the steps of:

marking each component web upstream of entry into its respective web storage; continuously measuring the lengths of each component web and the single face web passing points upstream and downstream of the respective storages; continuously measuring the length of the double face web passing through the cut off apparatus; subtracting the measured length of the double face web from a total order length to provide a continuously decreasing remaining order length; initially sensing each of the component web marks as each mark successively passes the upstream and downstream length measuring point for each respective storage; measuring the web length entering each storage between upstream and downstream sensing of the respective mark to determine instantaneous lengths of each component web and the single face web in each of the respective storages; continuously adjusting each instantaneous storage length value by adding and subtracting, respectively, the measured lengths of web passing the upstream and downstream points of the respective storages to provide real time storage values; adjusting the real time storage value for the medium component web by applying the web compression factor to provide an adjusted real time storage value; determining the dynamic real time length of each component web between its splicer and the cut off apparatus by adding the real time storage values, adjusted real time storage value, and fixed distance values applicable to each respective component web; and, activating each of the component web splicers to make the splices when the remaining order length equals the dynamic real time length of the respective component webs, such that the splices in the double face web substantially coincide for cut out in the cutoff apparatus.

The method of the preferred embodiment of the present invention includes the use of resolvers placed in contact with the respective webs to provide the various continuous measurements of component web lengths, single face web length and double face web length. A resolver is preferably placed at each splicer, between the single facer and the single face web storage, between the single face web storage and the double facer, between the second liner web storage and the double racer, and at the cutoff apparatus. The method further preferably includes the steps of placing a mark sensor at the position of each resolver upstream of the double facer, and placing an additional mark sensor between the first liner web storage and the single facer.

The preferred method also includes the step of calibrating each of the resolvers upstream of the double facer to the resolver at cutoff apparatus. The calibrating procedure includes the steps of marking each component web at its respective splicer with a pair of sequential marks which are closely spaced in the direction of web travel; sensing the pair of marks at each resolver upstream of the double facer to determine the web length output of each resolver in the time between sensing set marks; determining the double face web length passing the resolver at the cutoff apparatus in the time between sensing said marks at the respective resolvers upstream of the double facer; comparing each of the web length outputs from sensing said marks to the determination of double face web length passing the resolver at the cutoff apparatus; and, adjusting each of the upstream resolvers so that the web length output of each such resolver more nearly equals the double face web length determined in the time between sensing the marks. The marking step is preferably repeated periodically and the adjustment of the web length output of each upstream resolver is done adaptively by applying at each adjusting step a selected fraction of the difference resulting from the comparison of web length outputs from the upstream resolvers and the double face web length determined for the relevant time between sensing the marks.

The method of the present invention preferably also includes characterization of the response times for each of the component web splicers in which the web source includes a pair of rolls of component web materials, and the process of activating each splicer includes the steps of severing the moving component web in use from one roll, and attaching the leading edge of the component web from the other roll to the trailing edge of the severed component web. The method further includes the steps of generating a splice activating control signal to each splicer, measuring the elapsed time between generation of the control signal and actual completion of each respective splice to provide a response time for each splicer, and utilizing the splicer response time to independently adjust the timing of control signal generation for the respective splicer.

BRIEF DESCRIPTION OF THE DRAWING

The single drawing FIG. shows a schematic representation of a complete corrugator for the production of corrugated paperboard web to which the splice synchronization system of the present invention is applied.

DETAILED DESCRIPTION OF THE PREFERRED EMBODIMENTS

The corrugator system shown in the drawing is capable of producing a double wall corrugated paperboard web which includes two layers of corrugated medium separated by a liner web and enclosed on its upper and lower surfaces by additional liner webs, such that the composite double wall paperboard web comprises, in order from top to bottom, an upper liner web, a corrugated medium, an intermediate liner web, a corrugated medium, and a lower liner web. The present invention will be described, however, with respect to control of the corrugator system in the production of a conventional single wall corrugated paperboard web which includes a single corrugated medium enclosed by a pair of liner webs. The method and apparatus of the present invention are nevertheless fully adaptable to the control of the corrugator in the production of double wall paperboard as well.

Each component web used to form the composite paperboard web is provided from a component web source which includes a splicer to add web material to an expiring roll or to splice in a different size material for an order change. Each of the splicers is constructed and operates identically, except for possible variations in response times between the several splicers which will be discussed below.

The single wall or, as it is also known, double face paperboard web 10 is formed from three component webs, including a first liner web 11 supplied from a first liner web source 12, a medium web 13 supplied from a medium web source 14, and a second liner web 15 supplied by a second liner web source 16. The webs 11, 13 and 15 are combined in stages along the length of the corrugator wet end which is generally defined as the portion of the corrugator system between the first liner web source 12 and a downstream shear 17 where the composite double face paperboard web 10 is cut to change from a completed order to the next order and to remove defective sections of paperboard 10, including sections containing web splices.

The first liner web source 12 includes a first liner splicer 18 which is supplied by two liner material rolls 20 and 21. The first liner web 11 may be supplied from one liner material roll 20, while the other liner material roll 21 is maintained in a standby position for splicing to the trailing edge of the severed liner web 11 as needed. The first liner web 11 travels from the roll 20 through the splicer 18 and into a variable length storage which includes a movable takeup mechanism or dancer roll 22. The variable length storage provided by the dancer roll 22 allows the withdrawal of liner web 11 from the roll 20 to be slowed during operation of the splicer 18 and to accommodate speed changes in the downstream single facer 41 to be described. From the dancer roll mechanism 22, the web 11 travels over the cylindrical drum of a liner preheater 23 and the amount of wrap of the web on the drum may be varied depending on the selected position of a pivotal wrap arm 24 including an outer roll 25 around which the web 11 passes and is held in engagement with the surface of the liner preheater 23. From the preheater 23, the web 11 passes between a pressure roll 26 and a corrugating roll 37 where it is joined to the medium web 13.

In a manner similar to the first liner web source 12, the medium web source 14 includes a pair of medium web material rolls 28 and 30, one of which rolls 28 supplies the medium web 13 currently in use while the other roll 30 is maintained in a standby position for splicing to the web 13 when needed. The medium web 13 also passes through a medium splicer 31, a variable length storage in the form of a dancer roll mechanism 32, and around a preconditioner 33 upon which the medium web 13 may be wrapped by a selected amount depending on the position of the outer idler roll 35 on the pivotal wrap arm 34. From the preconditioner 33, the medium web 13 passes between a pair of corrugating rolls 36 and 37 which provide the web 13 with the well known fluted or corrugated configuration characteristic of the corrugated paperboard medium. The corrugating rolls operate to substantially compress the length of the medium web 13 such that, in the finished paperboard web 10, substantially more medium web 13 material than liner web 11 material is required. The ratio may be, for example, in the range of 1.5 to 1 and remains substantially fixed for any given pair of corrugating rolls 36 and 37. A glue applicator 38 is positioned to apply an adhesive to the tips of the corrugations or flutes on one side of the corrugated medium web 13 as it passes around corrugating roll 37. The corrugated medium web 13 passes between the nip formed by pressure roll 26 and corrugating roll 37 where it is pressed against the face of liner web 11 to form a two layer sub-composite web or single face web 40. The combination of pressure roll 26, corrugating rolls 36 and 37, and glue applicator 38 comprises a mechanism referred to as a single facer 41. The single facer 41 includes a variable speed drive, the variations in speed of which are accommodated by the dancer roll takeup mechanisms 22 and 32 through which the liner web 11 and medium web 13, respectively, are supplied. The single face web 40 exiting the single facer 41 is delivered to a bridge storage 42 in which the single face web 40 is deposited in a looped or lapped configuration and is stored in a variable length, depending on the speeds of the single facer 41 delivering single face to the bridge 42 and the downstream double facet 43 (to be described) which includes a separate variable speed drive and which withdraws the single face web 40 from the bridge. The single face web 40 may be supported in the bridge by a slow moving belt conveyor or the like in a manner well known in the art.

In the system shown in the drawing, the single face web 40 travels from the downstream end of the bridge 42 over another liner web source 44, medium web source 45, and single facer 46. Single facer 46, supplied by liner and medium webs from sources 44 and 45, respectively, is in all respects identical to single facer 41 and its web sources 12 and 14, previously described. Single facer 46 would be utilized to provide an additional single face web 47 were the system used to manufacture a double wall paperboard web. Details of the construction and use of the additional single facer 46 and its mode of operation will only be referred to briefly hereinafter.

The single face web 40 leaving the bridge 42 passes around a single face bridge guide 48 to help maintain web alignment and from there around the drum of a single face preheater 50 in which the amount of wrap is controlled by a pivotal wrap arm 51 in a manner similar to that described previously with respect to the liner preheater 23. The preheated single face web 40 then passes into a glue machine 52 in which an adhesive is applied to the tips or crests of the exposed corrugated flutes on the underside of the single face web 40 and to which the second liner web 15 is attached in a double backer 43 to complete the double face paperboard web 10. The second liner web source 16 includes a second liner splicer 55 to which the second liner web 15 is supplied from a liner material roll 56 and a backup or standby liner material roll 57. The second liner web 15 passes from the splicer 55 into a variable length storage dancer roll mechanism 58, identical to the dancer roll mechanisms 22 and 32 previously described. From the dancer roll takeup 58, the second liner web 15 passes into a preheater 61 and around a liner web preheater 60 including a pivotal wrap arm 62 which can be positioned to vary the amount of liner wrap in the same manner as previously described preheaters 23 and 50. The preheated second liner web 15 is then brought into contact with the underside of the single face web where the two webs are pressed together between a series of upper pressure rolls 63 and a series of lower hot plates 64 to cure the glue and form the double face paperboard web 10. The paperboard web then travels through the rotary shear 17 which may be activated on demand to cut out short sections of scrap which are diverted at the shear from the system. The shear 17 defines the downstream end of the corrugator wet end.

The double face paperboard web 10, exiting the corrugator wet end at the shear 17, travels through a slitter/scorer 65 which slits the web longitudinally and provides longitudinal score lines for subsequent folding of cut sheets. The narrower slit webs pass from the slitter/scorer 65 into a rotary cutoff knife 66 in which the narrower slit webs are cut into selected lengths. The cutoff knife 66 typically has two levels so that each narrow slit web may be cut separately. The cut sheets or boards are directed downstream where they are stacked and removed from the system, all in a well known manner.

Microprocessor control has long been used to coordinate the wet end and dry ends of a corrugator to provide accurate order processing and to minimize waste. Ideally, the desired number of cut sheets in an order is related directly to the length of web required and the web length is continuously measured, for example, just downstream from the shear 17, and the length of boards cut in the cutoff knife 66 is counted and continuously subtracted from the order length. When the order has been filled, the shear 17 is activated to cut the web at the point coinciding with the tail end of the last board for the order. The shear 17 is also utilized to cut out scrap from the web, either because of detected defects in one of the component webs or in the adhesive bond between them, or to cut out a portion of the web containing a splice. The shear typically includes a diverter mechanism which automatically removes the cut out scrap sections from the system. The control system keeps track of the length of scrap removed and automatically adjusts the system to maintain the proper length of web required to fill the order.

If an order change requires a change in the width of the web 10 and, consequently, changes in the widths of the component webs 11, 13 and 15, the goal in the paperboard industry has long been to synchronize the splices made at splicers 18, 31 and 55 so that the splices coincide in the finished double face web 10 for simultaneous cut out at the shear 17, thereby minimizing scrap. However, because of the many processing variables associated with the operation of the corrugator wet end, including continuously variable storage and takeup lengths at the splicers and on the bridge, wrap arm adjustments, and splicer response times, accurate splice synchronization has not been attainable. In addition, the systems and devices used to track and measure web lengths, including each of the component webs and the composite paperboard web, have been found to be incapable of maintaining the accuracy required.

In accordance with the present invention, an accurate real time determination of web length of each of the component webs 11, 13 and 15 between each respective splice and the downstream shear 17 is made and continuously adjusted. Variable length storage and takeup sections are precisely monitored and each of the component web splicers 18, 31 and 55 is independently fired when the remaining component web length equals precisely the length needed to complete the order. In addition, a calibration procedure is utilized to constantly monitor the accuracy of the individual web length measuring devices for the component webs 11, 13 and 15 and the single face web 40, which are compared to a master web measuring device at the shear 17 and adjusted, if necessary, to coincide with the master device.

Beginning at the first liner web source 12, the liner web 11 leaving the first liner splicer 18, before entry into the dancer roll takeup mechanism 22, is continuously measured by a first liner web resolver 67 placed in direct contact with the moving web 11. The resolver provides an absolute rotational position value and, therefore, an absolute measure of web length passing in contact therewith. One advantage of utilizing a resolver rather than, for example, a pulse generator is that a missed pulse from the latter (as a result of electrical interference or the like) cannot be recaptured and results in an automatic error in measurement. On the other hand, the automatic position value provided by a resolver is not subject to any such missed pulse or count. However, a pulse generator with a synchronizing pulse per revolution, or an absolute encoder could also be used.

An upstream single face web resolver 68 is placed in contact with the single face web 40 as it exits the single facer 41. The single face web resolver 68 provides multiple web measuring functions, one of which is to operate in conjunction with the first liner web resolver 67 to provide a dynamic real time measurement of the amount of liner web 11 in the variable length storage provided by the dancer roll takeup 22 and the liner preheater 23. If the length of first liner web material 11 between the liner web resolver 67 at the splicer and the single face web resolver 68 can be initially determined at some instant in time while the web is running, then that instantaneous measurement of length can be continuously adjusted by adding to it the length of web 11 leaving the splicer (as measured by resolver 67) and subtracting from it the length of single face web 40 exiting the variable length storage (as measured by resolver 68). It should be pointed out that from the point where the web 11 leaves the liner preheater 23 to the downstream location of single face web resolver 68, there is no variation in the length of the liner web 11 portion which passes between the pressure roll 26 and corrugating roll 37 and is joined with the corrugated medium web 13.

To make the instantaneous determination of variable storage length of the first liner web 11, an upstream liner web marker 70 and upstream mark sensor 71 are positioned adjacent the web at the location of the liner web resolver 67. The web marker 70 may, for example, comprise a device which applies a narrow ink mark to the moving web and the mark sensor 71 may be a photoelectric device which is capable of sensing or reading the edge of the mark as it passes and generating a control signal indicative of sensing the mark. A downstream mark sensor 72 is positioned adjacent the web 11 where it exits the liner preheater 23 and prior to passage around the pressure roll 26. If the mark applied to the web 11 by web marker 70 is on the underside thereof, the location of downstream mark sensor 72 is the last position at which the mark can be sensed before it is covered by the medium web 13 in the single facer. In this manner, the mark will not be seen and affect the appearance of the finished paperboard web 10.

With the liner web 11 moving through the system, a mark is applied to the web by web marker 70 and that mark is immediately sensed by the upstream mark sensor 71. When the mark reaches downstream mark sensor 72, it is again sensed, and the web length measured by liner web resolver 67 during passage of the marks between sensors 71 and 72 is the instantaneous length of web in the variable length storage of dancer roll takeup 22 and liner preheater 23. As previously indicated, that instantaneous measurement of the length of liner web 11 is then continuously adjusted by adding to it the length of web measured by liner web resolver 67 and subtracting therefrom the length of web measured by single face resolver 68. The result is a dynamic real time value of the web length passing through the variable storage of the liner web source 12.

The medium web 13 is similarly monitored and measured from its source 14 to the downstream point of the single face resolver 68. The medium splicer 31 is provided with a medium web resolver 73, a medium web marker 74 and a medium mark sensor 75, all in a manner similar to the arrangement provided at the liner splicer 18 previously described. A single face mark sensor 76 is located at the single face web resolver 68 in a position to sense the mark applied to the medium web 13 by the web marker 74. In a manner similar to that described for the liner web 11, an instantaneous determination of the amount of medium liner in the variable storage comprising the dancer roll mechanism 32 and preconditioner 33 is made by marking the medium web 13 with the marker 74, immediately reading the mark with coincident mark sensor 75, sensing that mark when it passes the single facer with mark sensor 76, and measuring the length of medium web which has passed medium web resolver 73 between the sensing of the web mark by sensors 75 and 76. That instantaneous determination of length of medium web must, however, be adjusted to account for the compression in web length caused by passage of the web through the corrugating rolls 36 and 37. The web length compression is fixed and unchanging, and the instantaneous length measurement may be adjusted by applying a constant web compression or corrugating factor. Once the instantaneous measurement of length has been made, a dynamic real time determination of the length of medium web 13 between the splicer 31 and the downstream end of the single facer 41 is made by continuously adding to the instantaneous length the length of medium passing upstream web resolver 73 and subtracting the length of web passing the single face web resolver 68. Thus, the measurement of the lengths of each of the component webs 11 and 13, through their respective variable length storages to the point where they are joined in the single facer, are measured independently and dynamically to take into consideration all real time variations in their respective storage lengths.

The single face web 40 entering the bridge 42 carries the web mark which has already been sensed by the single face web sensor 76. As the single face web is temporarily stored in and travels through the bridge, the mark will eventually emerge and enter the preheater 61 where it is wrapped by some selected amount around the single face preheater 50. Just downstream from the preheater, a downstream single face mark sensor 77 also reads the mark. The amount of single face web 40 passing the upstream single face web resolver 68 between the two sensings of the mark at mark sensors 76 and 77 represents the instantaneous value of the bridge storage at the time of the latter mark reading. From that time, a continuous real time determination of the amount of web stored in the bridge is made by adding to the instantaneous length value the amount of material passing upstream single face web resolver 68 and subtracting the length of material passing a downstream single face web resolver 78 positioned adjacent the downstream mark sensor 77.

The distance traveled by the single face web 40 from the preheater 50 to the pressure rolls 63, where it is joined with the second liner web 15 in the double facer 43, is fixed and constant. Similarly, the distance downstream from the pressure rolls 63 to the shear 17 is fixed for both the single face web 40 and the second web liner 15 which is joined to it to form the double face paperboard web 10. The length of the composite paperboard web 10 is monitored at the shear by a master resolver 80.

At any instant in the time of operation of the corrugator wet end, the precise length of any component web 11, 13, or 15, from the shear 17 back to the respective web splicer 18, 31, or 55, may be precisely determined by adding the instantaneous storage values in the splicer takeups 22, 32, or 58, the double face bridge storage value as applicable, and any fixed distance values applicable to a respective component web. Each of these dynamic real time component web lengths may be continuously compared with the remaining order length signal which is determined by subtracting the measured length of the double face web 10 passing the master resolver 80 at shear 17 from a total order length. When the remaining order length equals the dynamic real time length of the respective component web 11, 13, or 15, the respective web splicer is fired to mark the end of the order being run and to splice in the proper component web for the new order. The splices in the webs 11 and 13 will come together and coincide in the single facer 41 and the splice in the second liner web 15 will coincide and become synchronized with the other two splices at the pressure rolls 63 in the double facer 43 such that the sequence of splicers does not expose glue on the medium web.

The master resolver 80 at the shear 17 controls the order length and is also used to provide the measure of continuously decreasing remaining order length or lineal remaining for comparison with the real time lengths of the respective component webs. As will be appreciated from the prior discussion, the accuracy of the resolvers used to measure lengths of the various component webs is crucial to the overall accuracy of the splice synchronization system of the present invention. The corrugator may typically contain hundreds of feet of web material at any one time and an order may require thousands of feet of corrugated paperboard. Small variations in the diameters of the rotary wheels of the resolvers in contact with the various component webs could result in large cumulative errors over the length of any order run. Even errors of a few thousandths of an inch due, for example, to thermal expansion or contraction, could cause errors significant enough to result in complete loss of splice synchronization. The system of the present invention, therefore, includes a calibration method whereby each of the resolvers located upstream of the double facer 43 is calibrated to the master resolver 80. Periodically while an order is being run, each component web 11, 13 and 15 is marked at its respective splicer, using the associated web markers 70, 74 and 82 with a pair of marks which are closely spaced in the direction of web travel, e.g. 10 feet (3 meters) apart. The pair of calibrating marks applied by web marker 70 to the first liner web 11 are successively sensed by the associated mark sensor 71 and, further downstream, by the next mark sensor 72. The lengths of material read by web resolvers 67 and 68 during the respective periods between calibration mark readings is stored. Similarly, a pair of calibration marks are applied to the medium web 13 by the web marker 74 and the length of web passing mark sensor 75 is measured and stored. As the medium web 13 exists the single facer 41, now corrugated and compressed in length and joined to liner web 11, the pair of calibration marks applied by web marker 74 are sensed by mark sensor 76 and the length of material passing web resolver 68 between the marks is measured. The measured length is multiplied by the corrugating compression factor to obtain a modified length for comparison with the length measured at web resolver 73 and the measurement is stored. The pair of calibration marks on the corrugated medium of the single face web 40 are again read by mark sensor 77 as the web exits the bridge and the web resolver 78 at that location measures the length between the marks. The output of resolver 78 is stored and compared with the length of double face web 10 passing the master resolver 80 in the same time period between reading the calibration marks. If there is any difference between the lengths measured by resolver 78 and resolver 80, the output of the former is adjusted to make it correspond to the output of the master resolver. Preferably, an adaptive control procedure is provided whereby any measured difference in the calibration lengths between resolver 78 and master resolver 80 is applied incrementally and the next periodic pair of calibration marks, applied for example a few minutes later, would apply a similar incremental adjustment as necessary. A similar calibration is applied to each of the other resolvers in an upstream direction from resolver 78. The next upstream resolver 73 is calibrated with respect to the corrected value resulting from calibration of downstream resolver 78. Finally, the upstream-most resolver 67 for the liner web 11 is calibrated to web resolver 68. Web resolver 68 is also used to calibrate the resolver 73 at the medium web splicer. This length calibration, however, must take into account the compression factor as a result of corrugating. Because the master resolver 80 controls the amount of material required by the system, calibrating each of the other upstream resolvers to the master resolver results in all resolvers being absolutely calibrated to the amount of material required by the system as well.

The web marker 82 located at the splicer 55 for the second liner web source 54 is used in conjunction with a mark sensor 83 and a web resolver 81 positioned therewith. A downstream mark sensor 84 and associated web resolver 87 are utilized in conjunction with the previously described devices at the splicer 55 to provide the instantaneous storage value of the liner component web 15 in the variable storage dancer roll mechanism 58 and around the preheater wrap arm 62, in the same manner previously described for the single face liner 11. Similarly, resolvers 81 and 87 are utilized to provide the running length values which are respectively added to and subtracted from the instantaneous storage length value to provide the dynamic real time storage value for the liner web 15. Finally, the resolvers 81 and 87 are periodically calibrated to the master resolver 80 utilizing the procedure previously described.

The system of the present invention can be utilized to provide web control and splice synchronization in the production of double wall paperboard where a second single face web 47 is interposed between the first single face web 40 and the liner web 15 in the double facer 43. The second single face web 47 is formed in a second single facer 46 from a second liner web 85 from liner web source 44 and a second medium web 86 from medium web source 45. Each of the second web sources 44 and 45 includes two component web roll stands, as previously described for first liner web source 12 and first medium web source 14. Each also includes a respective splicer, namely, second liner splicer 88 and second medium splicer 90. Indeed, second liner web source 44 may be identical in every respect to the first liner web source 12 and, likewise, second medium web source 45 may be identical to first web source 14. Liner source 44, therefore, includes a dancer roll take up mechanism 91 and a preheater 92 comprising together the variable length storage for the second single face web 47. The second medium web source 45 travels through a dancer roll takeup mechanism 93 and single facer preconditioner 94. The second single facer 46 includes a pair of corrugating rolls 95 and 96, a glue applicator 97, and a pressure roll 98, all operable in the same manner previously described with respect to the single facer 41 for the first single face web 40. The second single face web 47 is directed into a second variable length storage bridge 100 from which it is eventually withdrawn through bridge guide 101 and around the preheater roll 102 in preheater 61. From the preheater, the second single face web 47 travels through the glue machine 52 where the tips of the exposed flutes in the corrugated medium 86 are covered with glue from the glue applicator 103. In the downstream pressure rolls 63, the glued first single face web 40, glued second single face web 84 and the liner web 15 are brought together to form the double wall paperboard web. As is well known in the art, the second medium web source may include corrugating rolls 95 and 96 which provide a different corrugated medium 86 than the corrugated medium 13 provided by the first medium web source 14. For example, the first medium web 13 may be of the so-called C-flute configuration having 37 to 39 flutes per foot and the second medium web 86 may be of a so-called B-flute configuration having 47 to 50 flutes per foot.

The lengths of each of the component webs 85 and 86 of the second single face web 47 are tracked and continuously measured in the same manner as the component webs of the first single face web 40. Thus, between the second liner splicer 88 and its takeup mechanism 91 there are located a web resolver 104, a web marker 105, and a mark sensor 106. A second mark sensor 107 for the liner web 85 is located just downstream of the preheater 92 for the single facer 87. The length of the second liner web 85 is measured downstream of its variable storage by the second upstream single face resolver 107 located between the single facer 87 and the bridge 100.

The second medium web source also includes a resolver 110, marker 111 and sensor 112 for the medium web 86 located between the splicer 90 and the dancer roll takeup mechanism 93. The next downstream length measurement of the medium web 86, after it has passed through the variable length storage provided by the takeup mechanism 93 and preconditioner 94, is made by the resolver 108 and, similarly, the downstream mark sensor 113 operates in a manner similar to that described for the first single face mark sensor 76 for the first single face web 40. The single face web 47 leaving the preheater roll 102 is also monitored by mark sensor 114 and web resolver 115 to provide the initial and dynamic real time length values for the bridge storage 100.

A dynamic real time length measurement of each component web 85 and 86 of the second single face web 47, from the shear 17 back to each respective splicer 88 and 90, is obtained by using the combination of web markers, sensors and resolvers in a manner already described. Thus, the locations of the splices in these web components signaling an order change may be coordinated and synchronized in the single face web 84 and, in turn, synchronized with the splices in the single face web 40 and liner web 15, such that all five component web splices are synchronized at the shear 17 for cutout. Similarly, the calibration procedures previously described are fully applicable to the resolvers used in the subsystem for the second single face component web 47.

In the systems for certain corrugator dry ends, the shear 17 is eliminated and scrap is cut out and diverted at the cutoff knife 66. One advantage of using the cutoff knife to cut out and divert scrap is that operation of the knife is generally more precise and can remain synchronous with the length of boards being produced. On the other hand, cutting out scrap and diverting it at the shear may not allow the shear to remain synchronized with the knife and, as a result, an additional piece of scrap will also be generated at the knife. The system of the present invention is fully applicable to systems cutting and diverting scrap at the shear or at the cutoff knife. In the latter system, the master resolver 80 is simply moved to a downstream location adjacent the cutoff knife 66.

Various modes of carrying out the present invention are contemplated as being within the scope of the following claims particularly pointing out and distinctly claiming the subject matter which is regarded as the invention.

We claim:

1. A method for synchronizing the location of splices defining changes in each of the component webs of an advancing double face paperboard web formed from three component web sources each including a splicer, wherein a first liner component web is directed from its source, through a first variable length liner web storage, to a single facer; a medium component web is directed from its source, through a variable length medium web storage and a web corrugator where the medium web length is compressed by a known compression factor, to the single facer where the first liner and corrugated medium webs are combined to form a single face web; the single face web is directed from its source, through a variable length single face storage to a double facer; a second liner component web is directed from its source, through a second variable length liner web storage, to the double facer where the single face and second liner webs are combined to form the double face paperboard web; and the double face web is directed through downstream processing apparatus, including a cutoff apparatus to cut out a selected length of double face web; said synchronizing method comprising the steps of:

(1) marking each component web upstream of entry into its respective web storage;

(2) continuously measuring the lengths of each component web and the single face web passing points upstream and downstream of the respective storages;

(3) continuously measuring the length of the double face web passing through the cutoff apparatus;

(4) subtracting the measured length of the double face web passing through the cutoff apparatus from a total order length to provide a continuously decreasing remaining order length;

(5) initially sensing each of the component web marks as each mark successively passes the upstream and downstream length measuring point for each respective storage;

(6) measuring the web length entering each storage between upstream and downstream sensing of the respective mark to determine instantaneous lengths of each component web and the single face web in each of the respective storages;

(7) continuously adjusting each instantaneous storage length value by adding and subtracting, respectively, the measured lengths of web passing the upstream and downstream points of the respective storage to provide real time storage values;

(8) adjusting the real time storage value for the medium component web by applying the web compression factor to provide an adjusted real time storage value;

(9) determining the dynamic real time length of each component web between its splicer and the cutoff apparatus by adding the real time storage values, adjusted real time storage value, and fixed distance values applicable to each respective component web; and

(10) activating each of the component web splicers to make the splices when the remaining order length equals the dynamic real time length of the respective component webs, such that the splices in the double face web substantially coincide for cut out in the cutoff apparatus.

2. The method as set forth in claim 1 wherein the storages for each of said component webs includes a web take-up and a web wrap arm.

3. The method as set forth in claim 2 wherein the storage for said single face web comprises a bridge accumulator.

4. The method as set forth in claim 1 wherein the steps of continuously measuring the length of each component web, the single face web, and the double face web includes placing resolvers in contact with the respective webs.

5. The method as set forth in claim 4 including the steps of:

(1) placing a resolver at each splicer;

(2) placing a resolver between the single facer and the single face web storage;

(3) placing a resolver between the single face web storage and the double facer;

(4) placing a resolver between the second liner web storage and the double facer; and, (5) placing a resolver at the cutoff apparatus.

6. The method as set forth in claim 5 including the steps of:

(1) placing a mark sensor at the position of each resolver upstream of the double facer; and, (2) placing an additional mark sensor between the first liner web storage and the single facer.

7. The method as set forth in claim 6 including the step of calibrating each of the resolvers upstream of the double facer to the resolver at the cutoff apparatus.

8. The method as set forth in claim 7 including the steps of:

(1) marking each component web at its respective splicer with a pair of marks closely spaced in the direction of web travel;

(2) sensing the pair of marks at each resolver upstream of the double facer to determine the web length output of each resolver in the time between sensing said marks;

(3) determining the double face web length passing the resolver at the cutoff apparatus in said time between sensing said marks;

(4) comparing each of the web length outputs in step (2) to the double face web length in step (3); and, (5) adjusting each of said upstream resolvers so that the web length output of each said upstream resolver more nearly equals the double face web length from step (3).

9. The method as set forth in claim 8 wherein the marking of step (1) is repeated periodically and the adjusting of step (5) comprises utilizing a selected fraction of the difference resulting from the comparing of step (4).

10. A method for synchronizing the location of splices in the component webs of a composite web forming system in which the composite web is formed by joining the component webs from multiple web sources, each of said web sources including a web splicer and a variable length web storage between the splicer and a downstream point of web joining, at least one of said component webs being subject to compression in length by a known compression factor prior to joining, and the system including a downstream cutoff apparatus operable to cut out a selected length of the composite web, said method comprising the steps of:

(1) measuring in real time the length of each component web between its respective splicer and the cutoff apparatus;

(2) measuring the length of composite web passing through the cutoff apparatus;

(3) continuously subtracting the measured length of composite web from a total order length to provide a continuously decreasing remaining order length;

(4) activating each of the component web splicers when the remaining order length equals the measured real time lengths of the respective component webs, including applying the compression factor to delay activating the splicer for the component web subject to compression; and, (5) activating the cutoff apparatus to provide the selected cut out length of composite web including all component web splices.

11. The method as set forth in claim 10 wherein each web source includes a pair of rolls of component web materials and activating each splicer includes the steps of: severing the moving component web in use from one roll, and attaching the leading edge of the component web from the other roll to the trailing edge of the severed component web.

12. The method as set forth in claim 11 including the steps of:

(1) generating a splice activating control signal to each splicer;

(2) measuring the elapsed time between generation of the control signal and completion of each respective splice to provide a response time for each splicer; and, (3) utilizing the splicer response time to independently adjust the timing of control signal generation for the respective splicer.

13. An apparatus for synchronizing the location of splices in the component webs of a composite web forming system in which the composite web is formed by joining the component webs from multiple web sources, each of said web sources including a web splicer and a variable length web storage between the splicer and a downstream point of web joining, at least one of said component webs being subject to compression in length by a known compression factor prior to joining, and the system including a downstream cutoff apparatus operable to cut off a selected length of the composite web, said apparatus comprising:

means for measuring in real time the length of each component web between its respective splicer and the cutoff apparatus;

means for measuring the length of composite web passing through the cutoff apparatus;

means for continuously subtracting the measured length of composite web from a total order length to provide a continuously decreasing remaining order length;

means for activating each of the component web splices when the remaining order length equals the measured real time lengths of the respective component webs, including applying the compression factor to delay activating the splicer for the component web subject to compression; and, means for activating the cutoff apparatus to provide the selected cut out length of composite web including all component web splices.

14. The apparatus as set forth in claim 13 wherein each web source includes a pair of rolls of component web materials and each splicer includes means for severing the moving component web in use from one roll and for attaching the leading edge of the component web from the other roll to the trailing edge of the severed component web.

15. The apparatus as set forth in claim 14 including:

means for generating a splice activating control signal to each splicer;

means for measuring the elapsed time between generation of the control signal and completion of each respective splice to provide a response time for each splicer; and, means for applying the splicer response time to independently adjust the timing of said control signal generating means for the respective splicer.

16. An apparatus for synchronizing the location of splices in the component webs of a composite web forming system in which the composite web is formed by joining the component webs from multiple web sources, each of said web sources including a web splicer and a variable length web storage between the splicer and a downstream point of web joining, at least one of said component webs being subject to compression in length by a known compression factor prior to joining, and the system including a downstream cutoff apparatus operable to cut off a selected length of the composite web, said apparatus comprising:

first web contacting devices for measuring in real time the length of each component web between its respective splicer and the cutoff apparatus;

second web contacting devices for measuring the length of composite web passing through the cutoff apparatus;

a microprocessor control for continuously subtracting the measured length of composite web from a total order length to provide a continuously decreasing remaining order length, for activating each of the component web splices when the remaining order length equals the measured real time lengths of the respective component webs, including applying the compression factor to delay activating the splicer for the component web subject to compression, and for activating the cutoff apparatus to provide the selected cut out length of composite web including all component web splices.

* * * * *